US009885579B2

(12) United States Patent
Rochberger et al.

(10) Patent No.: US 9,885,579 B2
(45) Date of Patent: Feb. 6, 2018

(54) INDOOR NAVIGATION TO KNOWN POINTS OF INTEREST (71) Applicant: Intel Corporation, Santa Clara, CA (US)

(72) Inventors: Haim Rochberger, Tel Mond (IL); Ron Rotstein, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/090,323

(22) Filed: Apr. 4, 2016

(65) Prior Publication Data
US 2016/0216120 A1 Jul. 28, 2016

Related U.S. Application Data (62) Division of application No. 14/039,945, filed on Sep. 27, 2013, now Pat. No. 9,307,366.

(51) Int. Cl.
G01C 21/12 (2006.01)
G01C 21/20 (2006.01)
H04W 4/02 (2009.01)
H04W 4/04 (2009.01)

(52) U.S. Cl.
CPC ........... G01C 21/206 (2013.01); H04W 4/02 (2013.01); H04W 4/028 (2013.01); H04W 4/043 (2013.01)

(58) Field of Classification Search
USPC ...................................................... 701/408
See application file for complete search history.

(56) References Cited

U.S. PATENT DOCUMENTS

| | | | | | |
|---|---|---|---|---|---|
| 8,265,011 | B2 * | 9/2012 | Sugar | ............... | G01S 5/021 370/328 |
| 9,014,172 | B2 * | 4/2015 | Sugar | ............... | G01S 5/021 370/350 |
| 9,307,366 | B2 * | 4/2016 | Rochberger | ......... | H04W 4/028 |
| 9,414,422 | B2 * | 8/2016 | Belghoul | ............. | H04W 4/008 |
| 2011/0301912 | A1 * | 12/2011 | Pandey | ................ | H04W 64/00 702/150 |
| 2013/0038488 | A1 * | 2/2013 | Cyganski | ............... | G01S 5/021 342/450 |
| 2013/0261964 | A1 * | 10/2013 | Goldman | ............... | G01C 21/12 701/500 |
| 2014/0099971 | A1 * | 4/2014 | Lim | .................... | G01S 5/0263 455/456.1 |
| 2014/0148196 | A1 * | 5/2014 | Bassan-Eskenazi | .... | G01S 11/02 455/456.1 |
| 2014/0343846 | A1 * | 11/2014 | Goldman | ............ | G05D 1/0272 701/525 |

(Continued)

OTHER PUBLICATIONS

"U.S. Appl. No. 14/039,945, Non Final Office Action dated Aug. 5, 2015", 8 pgs.

(Continued)

Primary Examiner — Tyler Paige
(74) Attorney, Agent, or Firm — Schwegman Lundberg & Woessner, P.A.

(57) ABSTRACT

Disclosed in some examples are methods, systems, and machine readable mediums that provide location based services such as navigation in an indoor space by utilizing a network of specially configured locator nodes (LNs) and the identified line of sight (LOS) relationships between the LNs. The LOS relationships may be automatically learned by the LNs.

21 Claims, 8 Drawing Sheets (56) References Cited

U.S. PATENT DOCUMENTS

2015/0094094 A1* 4/2015 Rochberger .......... H04W 4/028
                                                   455/456.3

OTHER PUBLICATIONS

"U.S. Appl. No. 14/039,945, Notice of Allowance dated Nov. 30, 2015", 8 pgs.
"U.S. Appl. No. 14/039,945, Response filed Jul. 24, 2015 to Restriction Requirement dated May 26, 2015", 8 pgs.
"U.S. Appl. No. 14/039,945, Response filed Oct. 29, 2015 to Non Final Office Action dated Aug. 5, 2015", 12 pgs.
"U.S. Appl. No. 14/039,945, Restriction Requirement dated May 26, 2015", 5 pgs.

* cited by examiner

INDOOR NAVIGATION TO KNOWN POINTS OF INTEREST

PRIORITY APPLICATION

This application is a divisional of U.S. application Ser. No. 14/039,945, filed Sep. 27, 2013, now issued as U.S. Pat. No. 9,307,366, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, Inc., All Rights Reserved.

TECHNICAL FIELD

Embodiments pertain to location based services, in particular some embodiments relate to navigation to known point of interests within a given indoor complex.

BACKGROUND

Location based services are a class of services that allow users to access features or functionality based upon the their location. For example, navigation applications allow users to easily navigate to a desired destination. These services typically rely on a Global Navigation Satellite System (GNSS) such as the Global Positioning System (GPS) to determine the location of the user. As these satellites broadcast signals that are used by receiving devices to calculate their precise location, absent special equipment, these signals are not typically available indoors. This deficiency leaves users without location based services such as navigation in many indoor environments.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Utilizing location based services indoors typically requires installing specialized hardware infrastructures (such as GNSS simulators) which can be an expensive solution. Disclosed in some examples are methods, systems, and machine readable mediums that provide location based services such as navigation in an indoor space by utilizing a network of specially configured locator nodes (LNs). In some examples, the LNs may be off the shelf access points (APs) which are specially configured to employ a protocol that allows them to determine line of sight (LOS) relationships amongst each other and use those relationships to build a network topology of LOS relationships. Mobile devices employed by users may then determine which LNs have a LOS relationship to the mobile device. These LOS relationships between the LNs and between the LNs and the mobile devices may then be utilized to provide location based services to users.

For example, the system may provide a navigation service to the user by calculating a path for the user from an LN within a LOS of the user's computing device at the user's current location to an LN nearby the desired location by utilizing the LOS based network topology. The route guides the user to the destination through a series of LNs within a LOS from the user. For example, the user is told to visually locate a first LN and navigate toward that LN. The user is then told to locate and navigate to another LN within a LOS of the first LN and so on until the user reaches a desired destination.

As already noted, to provide these location based services, in some examples, the LNs build a network topology based upon LOS relationships. To build the network topology, each LN may calculate a directed graph structure with itself as the root and LNs within a LOS of it as child nodes, and the children of its children being LOS to the children and so on. This graph may include weighted edges which may indicate a perceived or calculated distance. The perceived or calculated distance may be based upon one or more wireless metrics (e.g., signal strength, quality, or the like). These topologies may be utilized to provide location based services such as navigation by calculating a shortest path from the source to the destination based upon LOS relationships. The calculated path may be a path in the topology between a source node and a desired destination node. The path may correspond to a line of sight path in the indoor environment between the LN representing the source node and the LN representing the destination node. For example, the path may have an ordered set of LNs. Each successive pair of LNs in the ordered set may be in a LOS relationship with each other. Thus, if the path is LN 1 to LN 20 to LN 5, then the first pair (LN1, LN20) are in a LOS relationship with each other, and the second pair (LN20, LN5) are in a LOS relationship with each other. These methods require no hardware changes to client devices or the LNs and in many cases, an existing wireless infrastructure may be utilized.

Figure 1:
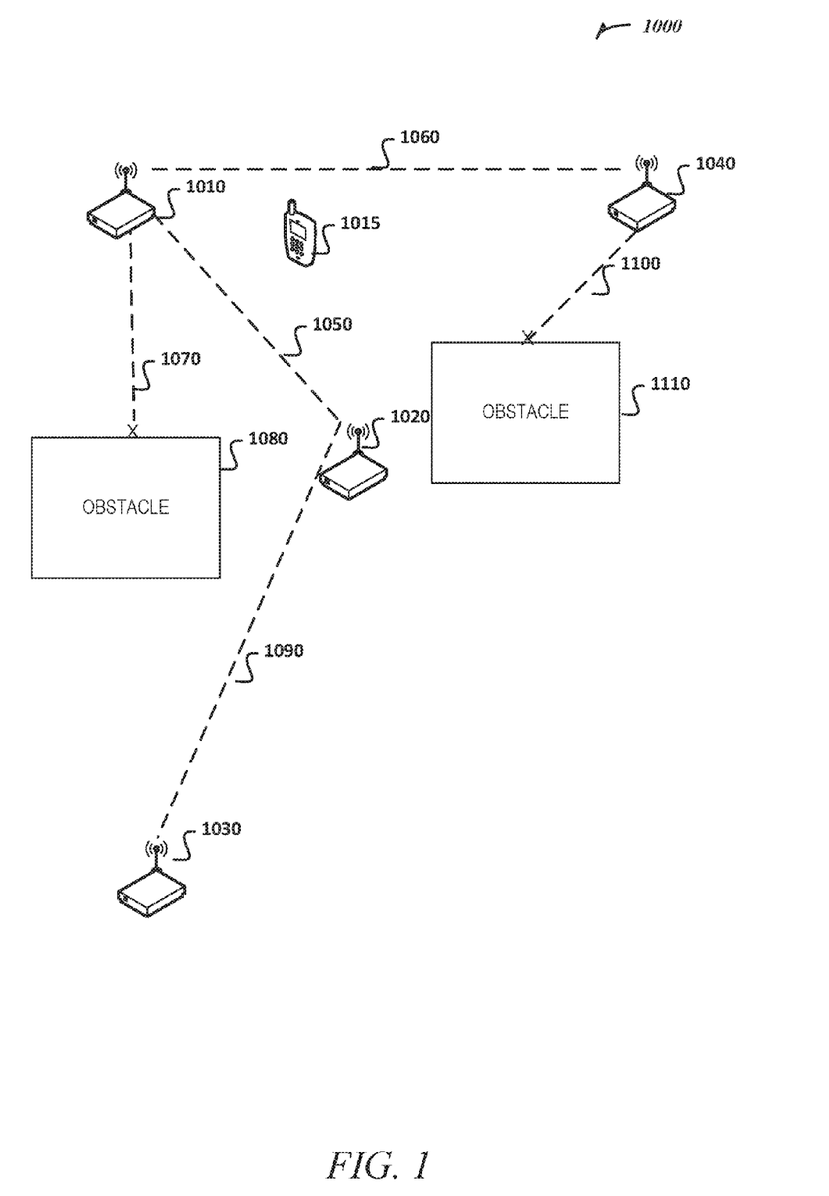
FIG. 1 shows an indoor navigation system according to some examples of the present disclosure.

Turning now to FIG. 1 an indoor navigation system 1000 according to some examples of the present disclosure is shown. LNs 1010, 1020, 1030, and 1040 may provide network connectivity or other services to one or more mobile devices 1015 and may also calculate network topologies based upon LOS relationships for system 1000. LNs 1010, 1020, 1030, and 1040 may operate in accordance with an Institute for Electrical and Electronics Engineers (IEEE) 802.11 family of standards (for example, 802.11ac, 802.11n-2009 or the like). In system 1000, LN 1010 has a line of sight (LOS) relationship to LN 1040, and 1020 as represented by dashed lines 1050 and 1060 in FIG. 1. LN 1020 has a LOS to LNs 1010 and 1030 as represented by dashed lines 1050 and 1090. LN 1040 has a LOS to LN 1010 as represented by dashed lines 1060. LN 1010 does not have a LOS to LN 1030 as represented by the interrupted dashed line 1070 which is blocked by obstacle 1080. Similarly LN 1020 does not have a LOS to LN 1040 as represented by the interrupted dashed line 1100. Based upon each LN's determination of the other LN devices that are in a LOS relationship with it, each LN may share with the other LN devices these relationships. After several rounds of sharing these relationships with each other, the LN's are able to determine a stable network topology based on these LOS relationships. The LNs may share this information through messages exchanged with each other which are herein referred to as "protocol messages" (PMs). The network topology build using these PMs may describe a logical heirarchy of LNs and may be ordered based upon LOS relationships. LOS relationships may be determined by an administrator (who determines LOS visually and may tell the protocol software on the device the LOS neighbors), or may be automatically determined by the LNs using wireless metrics determined from the received PMs.

Figure 2:
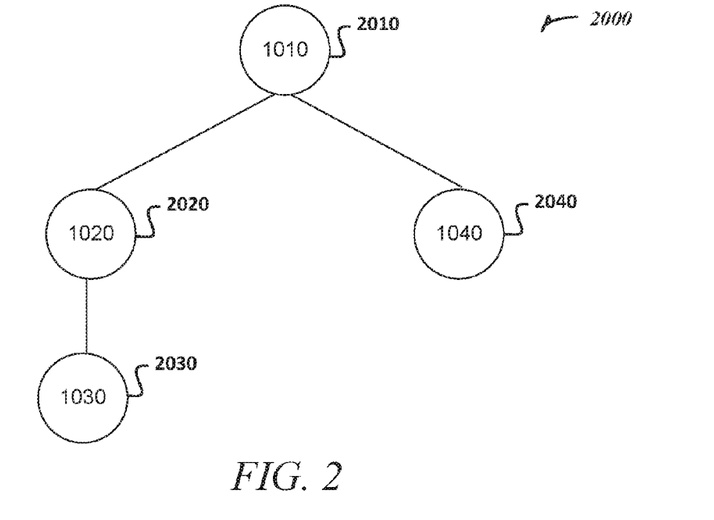
FIG. 2 shows a topology from the point of view of an LN according to some examples of the present disclosure.
Figure 3:
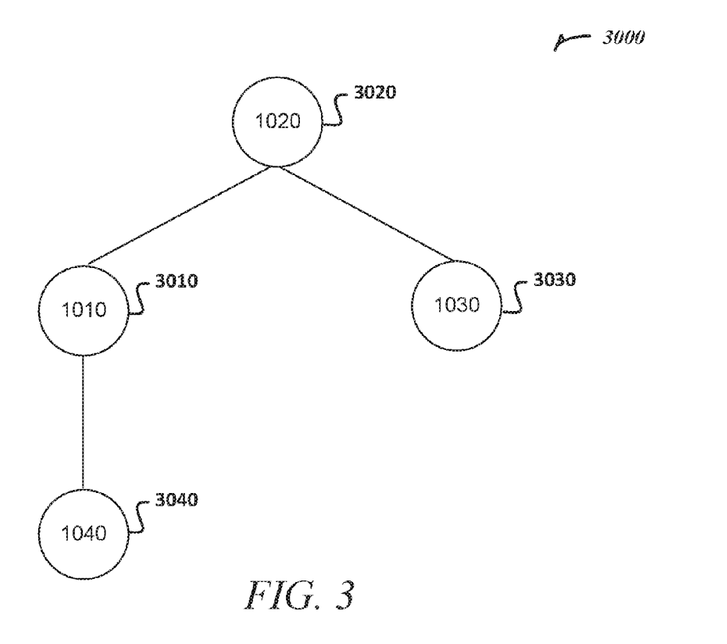
FIG. 3 shows a topology from the point of view of an LN according to some examples of the present disclosure.

FIG. 2 shows a topology 2000 from the point of view of LN 1010 of system 1000 according to some examples of the present disclosure. In the topology, each LN is referred to as a "node" in the topology. LN 1010 is the root node 2010, with child node 2020 representing LN 1020 and child node 2040 representing LN 1040. LNs 1010 and 1040 are child nodes because of their line of sight relationship with LN 1010. LN 1030 is in a line of sight relationship with LN 1020, thus LN 1030 will be a child node 2030 of node 2020 in the topology of FIG. 2. FIG. 3 shows a topology 3000 for node 1020 of FIG. 1 according to some examples of the present disclosure. The root node 3020 represents LN 1020 from FIG. 1. The two child nodes 3010 and 3030 represent LNs 1010 and 1030 from FIG. 1 respectively. The one grandchild node 3040 represents LN 1040 from FIG. 1. The other LNs in FIG. 1 generate their own topologies based on their identified LOS relationships accordingly. In general, a node represents an LN and an edge represents a LOS relationship between the nodes.

Turning back to FIG. 1, an example navigation route for mobile device 1015, based upon LOS navigation to the location of LN 1030 would be to have the user of the mobile device 1015 visually locate LN 1020 and move to that location, then visually locate 1030 and move toward that location. In some examples, the system may provide visual clues (e.g., photos, descriptions, or the like provided to the mobile device 1015 by the LNs) to assist users in visually locating the various LNs. In some further examples, the system may have the next LN in the route (the LN that the user is supposed to locate and move toward) provide an indicator, such as a blinking light, a noise or tone, or some other attention directing mechanism to guide the user in locating the LN.

Determining Line of Sight (LOS) Relationships

In some examples, determining LOS relationships may be based upon a configuration inputted into the system by an administrator. In other examples, determining a LOS relationship may be done automatically by the system using one or more wireless metrics. For example, a Received Signal Strength Indicator (RSSI) that describes a strength of a wireless connection between the LNs may be utilized to determine to a particular probability of whether or not the LNs are within LOS of one another. For example, the RSSI value associated with a received PM message may be utilized. In this way, the LNs that are in a particular LOS relationship with a particular LN will be discovered once they broadcast their PMs. The particular node then broadcasts the PM announcing the LOS relationship, and the other nodes in the system then update their network topologies to reflect these relationships. Eventually, the network stabilizes and all the LNs will have up to date topologies.

In some examples, a threshold RSSI value is utilized. If the RSSI of a particular received message (e.g., a PM) is better than the threshold value, then the subject LN may conclude the LN that sent the message is in a LOS relationship with the subject LN that received the message. In some examples, the RSSI value itself is not utilized, rather a comparison between all the neighbor's RSSI values to identify the "closest" RSSIs. For example, the subject LN may wait a predetermined period of time to wait for any other arriving PMs from other LNs in the system. The subject LN may then select a number of LNs that have the best returned RSSIs to select as having a LOS relationship. While RSSI is used herein, one or more other indicators like Received Channel Power Indicator (RCPI), travel time measurements (ToA), Channel Quality or the like may also be utilized.

In some examples, the algorithm utilized to determine LOS relationships may be averaged over time to produce less variation in the network. For example, if a particular LN has a RSSI that is at or near the threshold, momentary changes in the wireless environment may cause the LN to appear to go into, and out of, a LOS relationship with other LNs frequently. This may cause the network topologies to change frequently. To dampen this effect, the RSSI may be set high, and may be dampened. For example, the RSSI of several messages may be averaged to determine LOS relationships.

Building the Network Topologies

Figure 4:
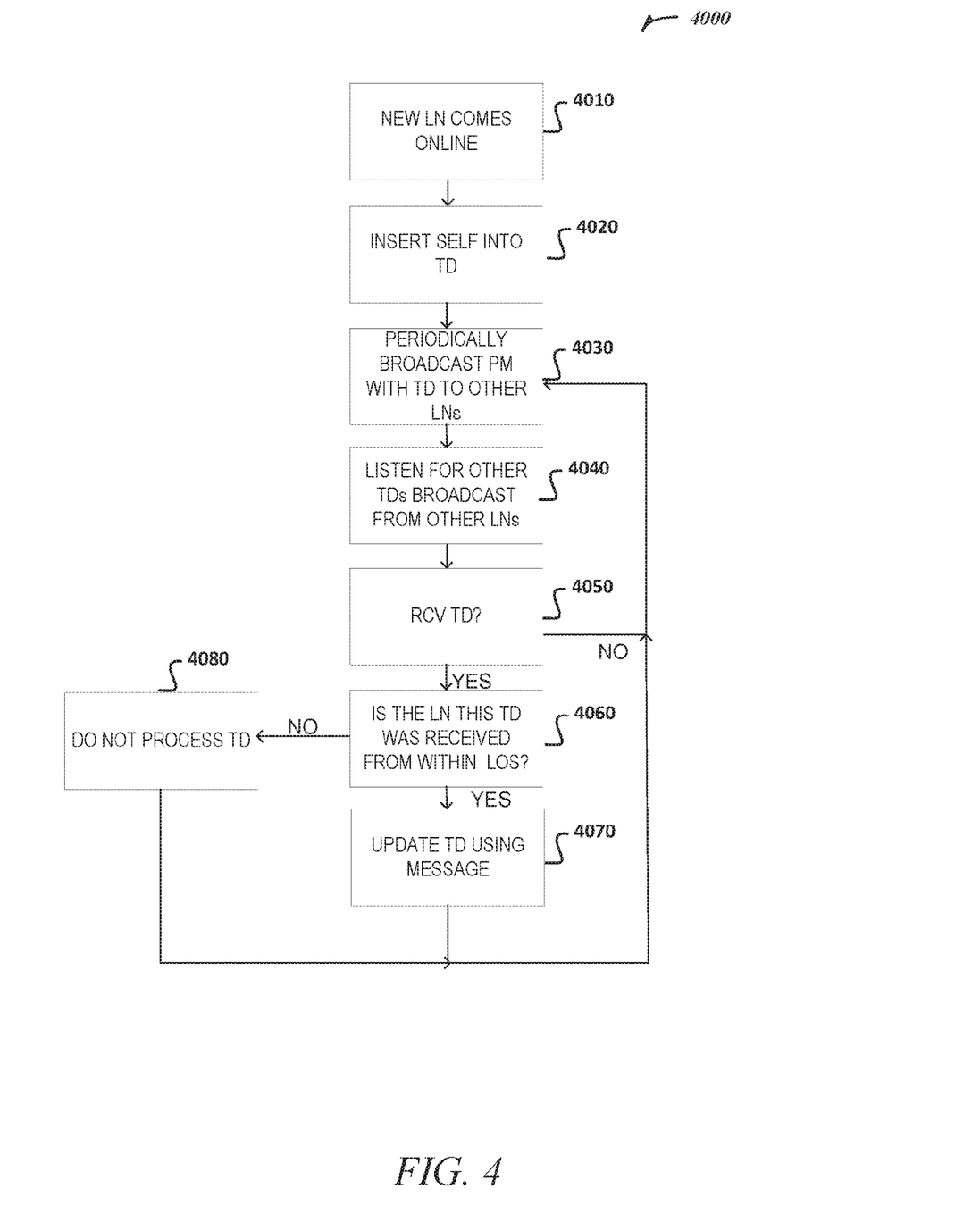
FIG. 4 shows an example method of building a network topology performed by a particular subject LN in the system according to some examples of the present disclosure.

The network topologies may be entered into each LN during configuration of the network. In other examples, the topologies may be determined dynamically and automatically by the LNs. FIG. 4 shows an example method 4000 of building a network topology performed by a particular subject LN in the system according to some examples of the present disclosure. Note that portions of this method, and the methods shown in FIG. 5 could also be performed by a mobile device to build its topology. At operation 4010 the subject LN comes online. When the subject LN first comes online, it may not have knowledge of any other neighboring LNs. At operation 4020 the subject LN may insert itself into the root node of a topology database (TD) maintained by it. The TD is an example data structure which stores a topology based upon LOS. Example data structures may include linked lists, hash tables, stacks, queues, dequeues, and the like. Each LN in the system may have its own TD. The TD may store a record of each node in the network, this record may be called a node descriptor. The node descriptor may include a node id, the number of "hops" (e.g., the number of edges between the node and the root node), the node id of its immediate parent, a timestamp indicating the last time the node was reported, an edge weight for the edge connecting this node and its immediate parent, and other fields.

At operation 4030 the subject LN may periodically broadcast a message according to the defined protocol for the system (hereinafter a protocol message or PM) with the node's current topology database to the other LNs. At operation 4040, the subject LN may listen for other topology databases broadcast by other LNs. An example PM may include a unique identifier for the LN broadcasting the TD. For example, the LN broadcasting the PM may be called the message root node (MRN) and the ID may be called a Message Root Node (MRN) ID. The PM may also include a sequence number of the message, the topology database of the node, and other fields. Table 1 shows an example message structure.

TABLE 1

| | SEQ# | | MRN ID |
|---|---|---|---|
| RSSI | Parent Node ID | Node Id | Hops from MRN |
| RSSI | Parent Node ID | Node Id | Hops from MRN |
| ... | ... | ... | ... |

If, at operation 4050, a topology database is not received, the LN goes back to periodically broadcasting the PM and listening for other PMs from other LNs at operations 4030 and 4040. If, at operation 4050, a PM was received from another LN (the sending LN), the subject LN determines if the sending LN is in a LOS relationship with the subject LN. In some examples, this may be done by consulting a file or database in which configuration information that was earlier manually input is stored. In other examples, a LOS relationship may be automatically determined using wireless metrics (as already described) such as an RSSI value of the received PM.

If the sending LN is in a LOS relationship with the subject LN, the subject LN calculates an updated TD at 4070 and then continues to periodically broadcast its updated TD as well as receive new updated TDs from other LNs at operations 4030 and 4040. If at operation 4080 the sending LN is not in a LOS relationship with the subject LN, the TD may not be processed. The LN may then continue to periodically broadcast its updated TD as well as receive new updated PMs from other LNs at operations 4030 and 4040.

Figure 5:
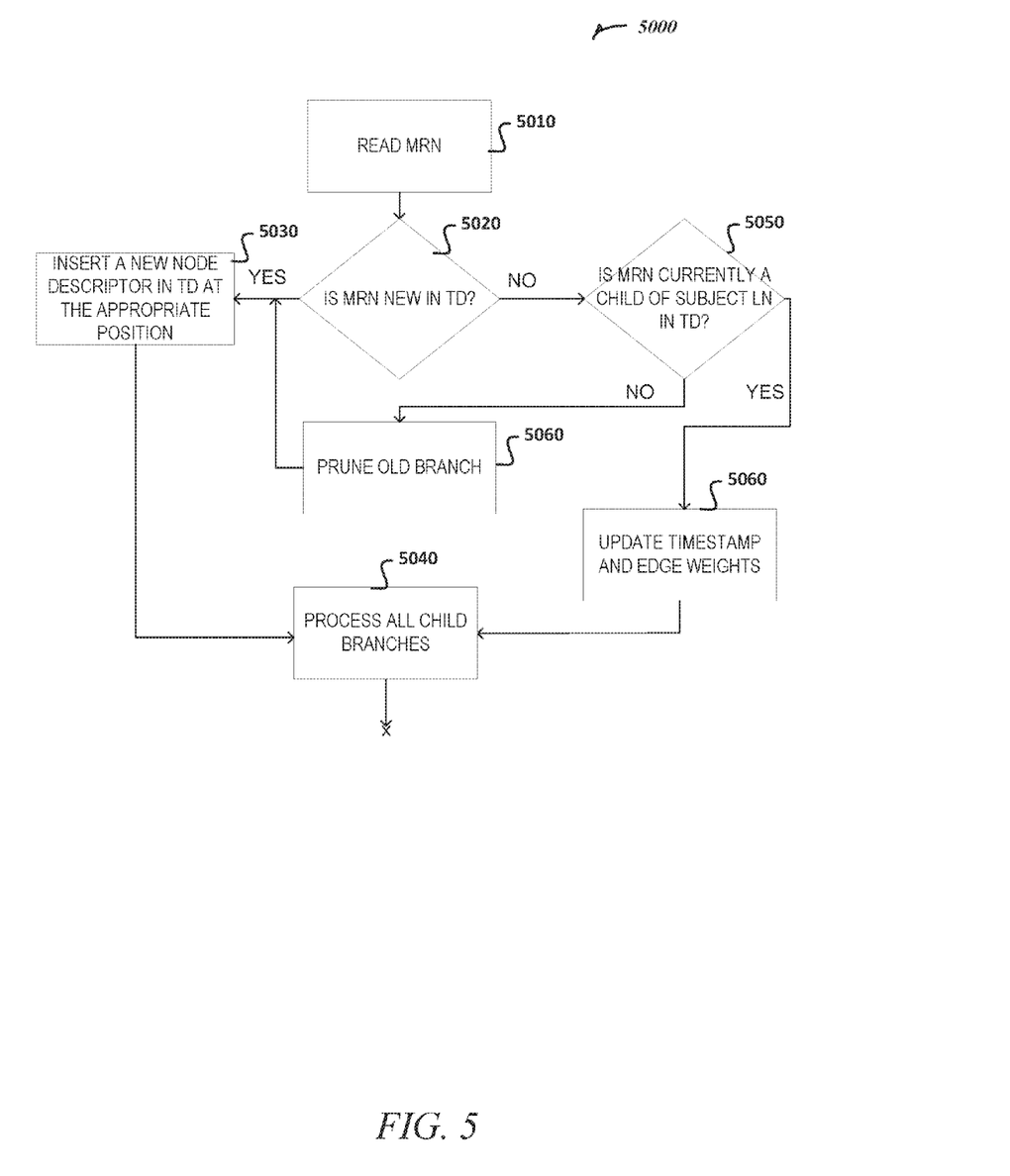
FIG. 5 shows an example method of updating the topology database based upon a TD received from an LN according to some examples of the present disclosure.

FIG. 5 shows an example method 5000 of updating the topology database based upon a TD received from an LN that is in a LOS relationship with the subject LN according to some examples of the present disclosure. At operation 5010 the Message Root Node ID is read from the PM. At operation 5020 a determination is made as to whether an existing node with a node id matching the MRN ID already exists in the TD. If the MRN ID is new (e.g., no match), a new child node is added to the subject node's TD with the parent of the new node being the root node (i.e., the subject LN). The various fields of the node descriptor are filled in, such as the edge weight, parent node (i.e., the subject LN), hop count, and the like. At operation 5040 any child nodes of the newly added node as specified in the PM are processed. Example methods of processing child nodes will be described later.

If it is determined at operation 5020 that the node is already in the TD of the subject node, at operation 5050 it is determined whether or not the node is already a child node of the root node. If it is not, that means that the sending LN was not in a LOS relationship with the subject LN before, but has now moved into a LOS relationship with it. At operation 5060, the old branch with the sending LN as the root is pruned from the TD and a new node for the sending LN is created with the subject LN as a parent is created at operation 5030, and any children are processed at operation 5040. If at operation 5050 the sending LN was previously a parent of the root node, the various fields such as timestamp and edge weights are updated according to the information in the PM, and then any children are then processed at operation 5040.

To process the child nodes, in some examples, recursive algorithms that process the PM in a depth first or breadth first fashion are both examples that are contemplated. These algorithms may traverse the PM and compare it to the existing TD. If the PM reports a new node, the new node is added to the TD at the appropriate location specified in the PM. In some examples, if a particular node included in the PM is already in the TD, but with a different path, only the shortest path to the particular node is kept, as determined by edge weight or hop count. Thus when a new child node is processed, the TD is searched to determine if the TD already contains the child node, and if the child node is in the TD, but as a child of a different parent, the current path in the TD may be kept if it is shorter (either in hop count or path length based on edge weight), or the new path may be used (and the old path pruned) if it is shorter.

For example, the following pseudo code shows one example network topology building algorithm:

```
For each child of the sending LN (MRN) in the PM, we can call the
following (which recursively calls itself for grandchildren,
great-grandchildren, and the like):
HandleBranch(PM, ParentNodeDesc, CurrentBranchNode,
    #hopsFromCurrentNode)
    {
// PM is the protocol message (or a pointer to it)
// ParentNodeDesc is a pointer to the data structure storing the parent
    node's information in the TD (the node descriptor). For the initial
    children of theMRN in the PM, this will be the root node (i.e. the
    subject LN) in the TD.
// CurrentBranchNode is a pointer to the current node in the PM.
//#hopsfromcurrentnode is the number of hops from the root.
        If CurrentBranchNode is the ParentNodeDesc in TD then return
        (end); //the subject LN should be a child of the sending LN
            //(MRN), but the subject node doesn't process itself.
        Else If CurrentBranchNode does not exist in the TD then
        {
            Add a new node descriptor to the TD and update the NODE
            ID, RSSI, parent node id, timestamp, hop count, and other
            fields from the PM.
        }
        Else If CurrentBranchNode exists in the TD then
        {
            If CurrentBranchNode direct parent in PM is the same node
            ID in TD
            {
                If the hop counts from the root node to the
                CurrentBranchNode are the same in the TD and PM
                (i.e. PM & TD are in agreement - no change):
            {
            Update the descriptor (e.g., timestamp and the
            edge weight) based upon the received PM;
            }
            Else (change on location in the same branch)
            {
            Update the descriptor (e.g., timestamp and the
            edge weight) based upon the received PM;
            Insert in new position in the branch by pointers
            (move with all children as in TD).
            Set # of hops as changed in PM;
            }
        }
        Else if there is a change in Parent node ID - i.e. change on
location/branch
        {
```

-continued

```
If the hop count to the CurrentBranchNode in the TD
is smaller or equal to the # of hops in the PM then
{
    (i.e. the existing path in the TD is equal or
    better...)
    Update the descriptor (e.g., timestamp and the
    edge weight) based upon the received PM;
    Return (ignore the rest of this branch)
}
Else (i.e. we discovered a shorter path to the node)
{
    Remove the node descriptor and all its
    children from their current branch in the TD
    Insert it to the new branch location as in the
    PM, with the new Parent - as in the PM
    Update the descriptor (e.g., timestamp and the
    edge weight) based upon the received PM;
    }
  }
}
For each child of the CurrentBranchNode childNodeDesc, call
HandleBranch(PM, CurrentBranchNode, ChildNodeDesc,
    #hopsFromCurrentNode+1)
}
```

Figure 6:
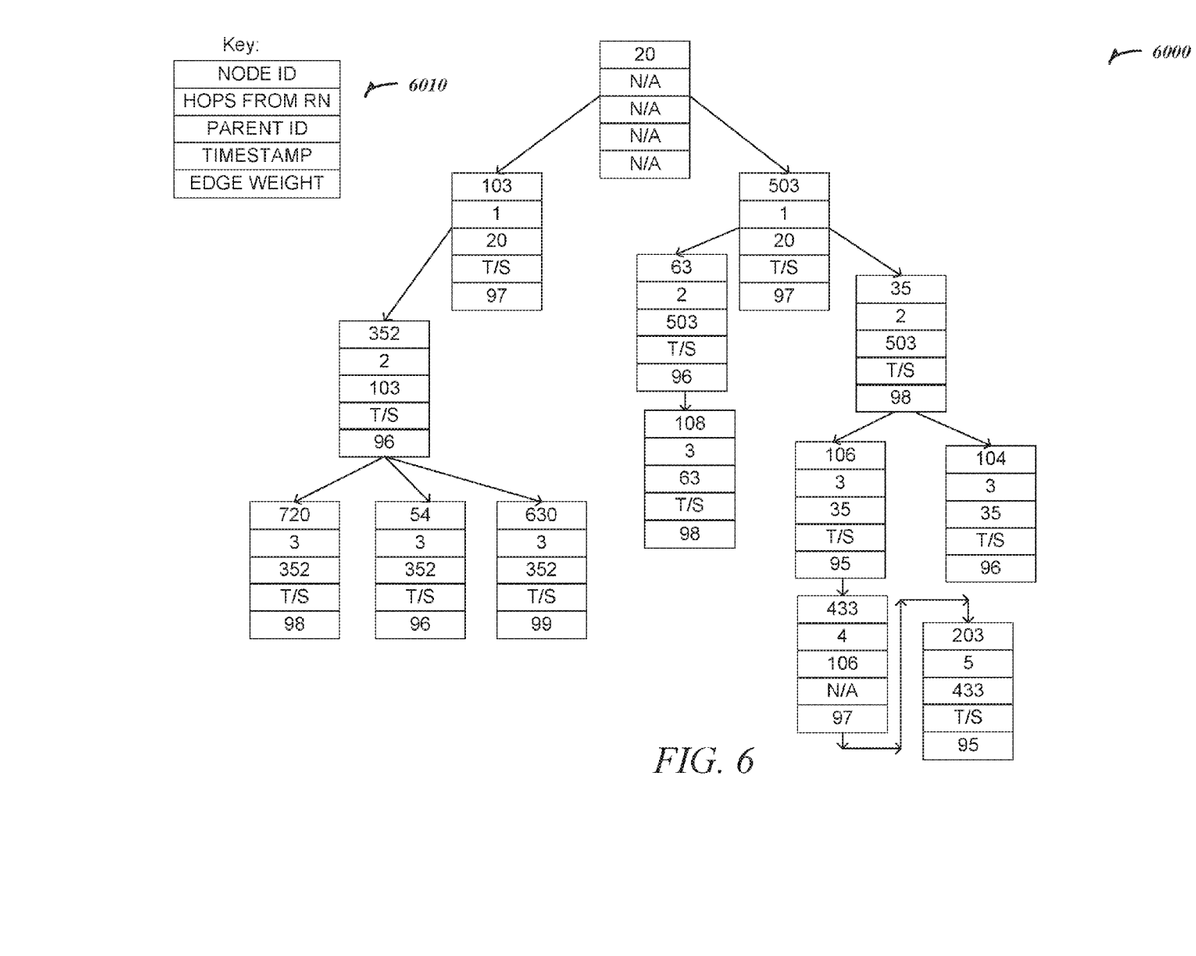
FIG. 6, an example TD of an LN according to some examples of the present disclosure.
Figure 7:
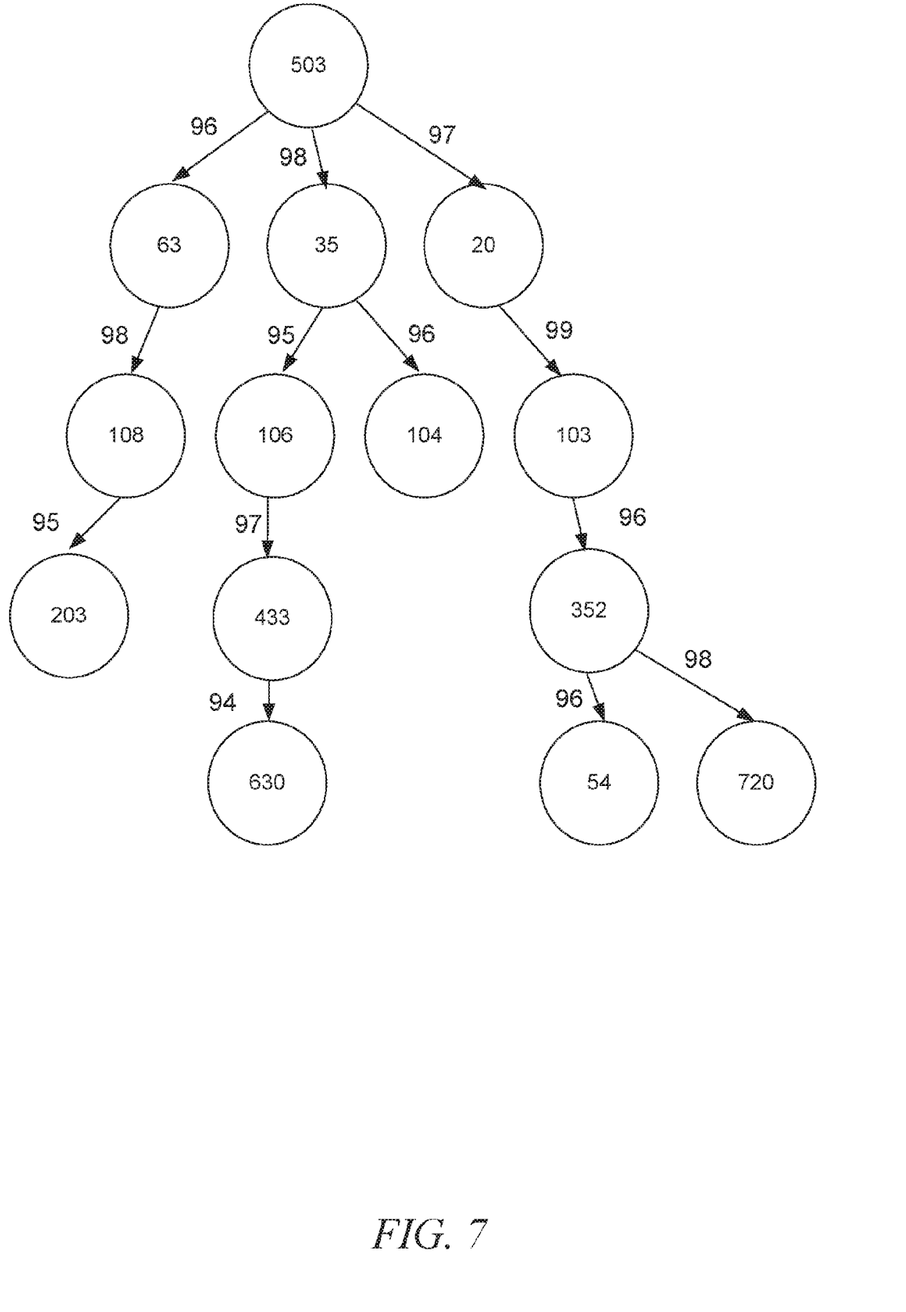
FIG. 7 shows the example PM message of table 2 in graph form according to some examples of the present disclosure.

An example application of the above routine is shown in FIGS. 6 and 7. Turning now to FIG. 6, an example TD 6000 of a subject node with ID 20 is shown according to some examples of the present disclosure. In the example, each node descriptor 6010 stores a Node ID, the number of hops from the root node, the node id of its immediate parent, a timestamp of when the last PM message from this node was received, and an edge weight describing the edge weight of the edge connecting this node with its immediate parent, along with a pointer to child nodes. An example PM received at this LN from an LN with an MRN ID of 503 is:

TABLE 2

| SEQ# 34 | | MRN ID = 503 | |
|---|---|---|---|
| 97 | 503 | 20 | 1 |
| 98 | 503 | 35 | 1 |
| 96 | 503 | 63 | 1 |
| 99 | 20 | 103 | 2 |
| 96 | 35 | 104 | 2 |
| 95 | 35 | 106 | 2 |
| 98 | 63 | 108 | 2 |
| 96 | 103 | 352 | 3 |
| 97 | 106 | 433 | 3 |
| 98 | 352 | 720 | 4 |
| 96 | 352 | 54 | 4 |
| 99 | 352 | 630 | 4 |
| 95 | 433 | 203 | 4 |

FIG. 7 shows the example PM message of table 2 in graph form according to some examples of the present disclosure. Working through the method, the PM message may be examined to determine if it is a neighbor. In the example from Table 2 and FIG. 7, we assume that it is a neighbor. Since it's a neighbor, we proceed to update the subject LN's (node 20) TD. First, the MRN ID is read (which is 503) and it is determined if the MRN is a new node in the TD. In this case it is not a new node, so it is determined if the LN is currently a direct LOS neighbor with the subject node. It is currently a neighbor, so the timestamp and edge weights (as reflected by the RSSI of the received PM) are updated.

Next, the child branches of the MRN are updated. The level 1 neighbors of the MRN as reported in the PM: 20, 63, and 35 are processed by handleBranch recursively calling itself with the following parameters:

handleBranch(PM,pointer_to_20_in_TD,
    pointer_to_20_in_PM,1)
handleBranch(PM,pointer_to_20_in_TD,
    pointer_to_63_in_PM,1)
handleBranch(PM,pointer_to_20_in_TD,
    pointer_to_35_in_PM,1)

Where pointer_to_20_in_TD is a pointer to the node descriptor for node 20 in the TD (the root node), and pointer_to_20_in_PM, pointer_to_63_in_PM, and pointer_to_35_in_PM are pointers to the node fields for nodes 20, 63, and 35 respectively in the PM. The hop count is 2 since these are all children of the root.

For node 20, we return immediately as it is the root node of the TD, i.e., it is the subject node and requires no further processing. For node 63, since it has node 503 as parent in both the TD of the subject node (node 20), and the PM, and the same hop # from node 20 (2 hops—via 503) then we just update the timestamp and edge weight. A call to handleBranch is also made to handle the child node of 63:
handleBranch(PM, pointer_to_node_63_in_the_TD,
    pointer_to_108_in_PM,2), where pointer_to_node_63_in_the_TD is a pointer to the node descriptor for node 63 in the TD, and pointer_to_108_in_PM is a pointer to the node descriptor for node 108 in the PM.

Since node 108's parent is node 63 in both the PM and the TD, the timestamp and edge weights are updated and a call to handleBranch(PM, pointer_to_node_108_in_the_TD, pointer_to_203_in_PM) is made for node 108's child in the PM, node 203. In the TD, node 203 is a child of node 433, and not a child of node 108. Since the number of hops is smaller in the PM (3) than in the TD (5), node 203 is moved from being a child of node 433 to being a child of node 108. The timestamp, edge weights, and all pointers are updated accordingly. The rest of the PM is handled similarly in a recursive manner.

While the above examples used a particular algorithm for building the topology descriptions from the various PM messages, one of ordinary skill in the art with the benefit of Applicants' disclosure will appreciate that other algorithms may be utilized.

In some examples, the subject LN maintains a timestamp of when the last PM was received from a particular node. If the LN hasn't received a PM from another node in a particular time period, the LN may delete that node from the topology. This ensures that LNs that may have left the system are automatically removed. In some examples, a garbage collection process may pass through the TD at predetermined intervals and remove nodes (and their children) where their timestamp has not been updated since a predetermined threshold.

Using the TDs to Provide Location Based Services

In order to provide location based services, mobile devices, such as mobile device 1015 from FIG. 1 may communicate with one or more of the LNs, such as LNs 1010-1040 from FIG. 1, in a unidirectional manner (e.g., the client device 1015 may receive broadcast messages) or in a bidirectional manner (e.g., the client device 1015 may also send messages to the LNs) in order to facilitate the provision of location based services to users of client device 1015.

Mobile device 1015 may determine its own network topology to provide location based services to users by listening to the PM messages as they are broadcast, and by calculating the network topology the same way as one or more of the LNs. This may include determining a LOS relationship to one or more LNs. LOS relationships may be determined manually, or in some examples, automatically using one or more wireless metrics (as explained earlier). LOS may be determined by either the mobile device 1015 (e.g., based upon received wireless signals from the LNs) or by one or more of the LNs which may then communicate the LOS information to mobile device 1015 (e.g., based upon received wireless signals from the mobile device 1015). In other examples, rather than calculate its own network topology, mobile device 1015 may receive (and adopt) a network topology from one or more of the LNs. For example, the mobile device 1015 may utilize a network topology from an LN with which it has a LOS relationship. If the mobile device 1015 has multiple LNs with a LOS relationship, the client device 1015 may combine the topologies to create a combined topology; use all the topologies and calculate a route for each of them and then using a selection criteria (e.g., using the topology that produces a shortest or most optimal path, or the like) to determine route which to use; use only those topologies that come from LNs which have a LOS relationship to the client device 1015; select a topology received from an LN with the best wireless metrics (e.g., the best signal strength, lowest latency, etc . . . ); select a topology received from an LN that is determined by one or more wireless metrics to be the closest LN; or the like. The network topologies may be used to provide the location based services (e.g., used to calculate a route). As the mobile device 1015 moves, it may be necessary to recalculate the network topology, or acquire a new one from a different LN.

The mobile device may utilize the LOS relationship information to determine a location. For example, an LN in a LOS relationship with the mobile device may be determined to be the user's current location. The mobile device may report this to a location based server, that may utilize this information to provide various location based services to the mobile user. For example, in the context of a large store, the server may deliver information about what products are near the user, what sale items are near the user, and the like.

The mobile device may utilize the network topology to calculate a route. In some examples, there may be only one path (e.g., because other paths were trimmed when the TD was constructed based upon the algorithm utilized). In other examples, there may be multiple paths and the mobile device may employ a shortest path algorithm (e.g., Dijkstra's algorithm) to find an optimal path between a node that is within a LOS of the mobile device and a destination node. The algorithm may utilize a hop count—e.g., the algorithm with the fewest "hops" may be preferred, or may utilize the route with the shortest overall distance (e.g., use total edge weight), or some combination.

In other examples, the mobile device 1015 may request location based services such as route guidance from one of the LNs 1010-1040 without having to use a network topology at the mobile device 1015. One of the LNs 1010-1040 may then calculate the route using its network topology and then send that route to mobile device 1015 who may then present the route to the user.

While the nodes in the network have been described as LNs, one of ordinary skill in the art with the benefit of Applicants' disclosure will appreciate that any computing device capable of transmitting a PM and calculating a TD may be utilized.

Figure 8:
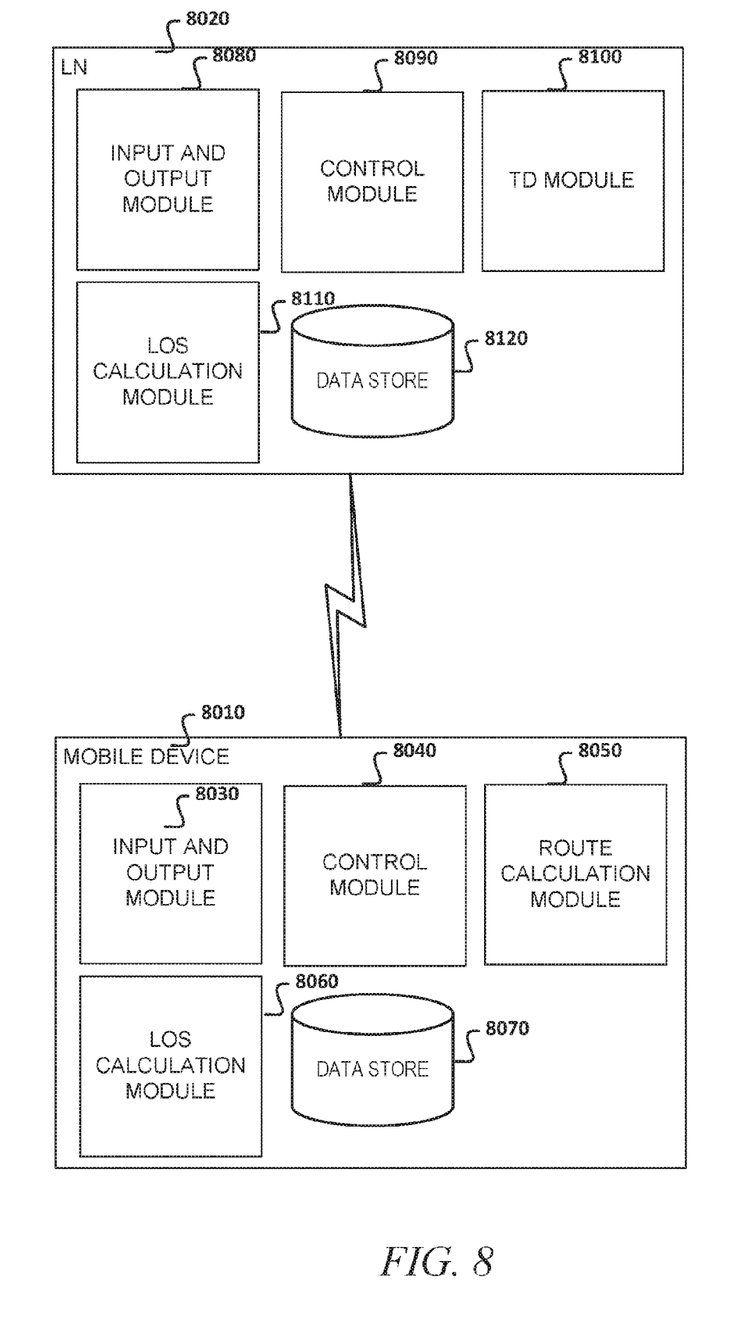
FIG. 8 shows a block diagram of a mobile device and an LN according to some examples of the present disclosure.

FIG. 8 shows a schematic of a mobile device 8010 and an LN 8020 according to some examples of the present disclosure. Mobile device 8010 may be any mobile computing device capable of providing location based services to a user of mobile device 8010 by communicating with one or more LNs. Example mobile devices may include a laptop computer, a tablet computer, a smartphone, a cellular phone, or the like. Mobile device 8010 may include an input and output module 8030 which may be configured to communicate with one or more LNs 8020, either directly or over a network. Input and output module 8030 may also be configured to accept user input, for example, through a touchscreen display, and output information to the user (including location based services), for example through a display, or the like. Control module 8040 may coordinate activities of the mobile device 8010, including communications with one or more LNs 8020 through the input and output module 8030. Control module 8040 may calculate a TD based upon received PMs. Control module 8040 may determine a location of mobile device 8010 based upon the TDs and LOS relationships determined by the LOS calculation module 8060. Route calculation module 8050 may calculate one or more routes from a point near a current location to a desired destination. Data store 8070 may store one or more TDs and other information.

LN 8020 may be any computing device capable of sending PM messages, receiving PM messages, and calculating a topology based on LOS relationships. Example LNs may include wireless access points, general purpose computing devices with wireless capability, tablets, notebooks, laptops, or the like. LN may have an input and output module 8080 which may communicate with one or more mobile devices such as mobile device 8010, and may communicate with one or more other LNs to exchange PMs. TD module 8100 may maintain and update the TD based upon PMs received from other LNs. TD module 8100 may store the current TD in the data store 8120. LOS calculation module 8110 may calculate LOS relationships to other LNs based upon wireless metrics associated with received PMs. Control module 8090 may coordinate the activities of the input and output module 8080, the TD module 8100, and the LOS calculation module 8110.

Modules, Components, and Other Logic

Figure 9:
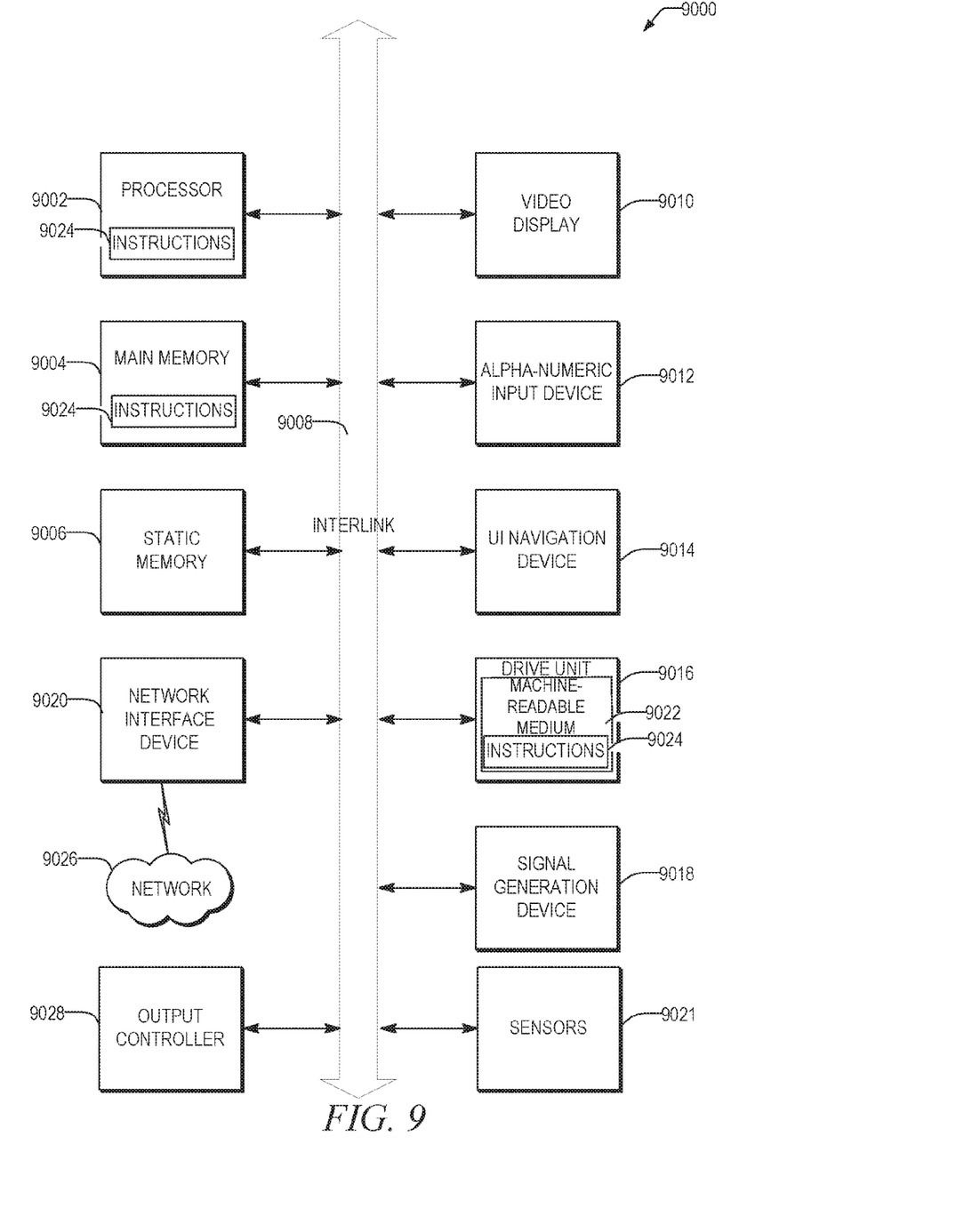
FIG. 9 shows a block diagram illustrating an example of a machine upon which one or more embodiments may be implemented.

FIG. 90 illustrates a block diagram of an example machine 9000 upon which any one or more of the techniques (e.g., methodologies) discussed herein may perform. For example, any one of the components of FIG. 1, and FIG. 8 may be or include portions of machine 9000. In alternative embodiments, the machine 9000 may operate as a standalone device or may be connected (e.g., networked) to other machines. In a networked deployment, the machine 9000 may operate in the capacity of a server machine, a client machine, or both in server-client network environments. In an example, the machine 9000 may act as a peer machine in peer-to-peer (P2P) (or other distributed) network environment. The machine 9000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 9000 may include a hardware processor 9002 (e.g., a central processing unit (CPU), a graphics processing unit (GPU), a hardware processor core, or any combination thereof), a main memory 9004 and a static memory 9006, some or all of which may communicate with each other via an interlink (e.g., bus) 9008. The machine 9000 may further include a display unit 9010, an alphanumeric input device 9012 (e.g., a keyboard), and a user interface (UI) navigation device 9014 (e.g., a mouse). In an example, the display unit 9010, input device 9012 and UI navigation device 9014 may be a touch screen display. The machine 9000 may additionally include a storage device (e.g., drive unit) 9016, a signal generation device 9018 (e.g., a speaker), a network interface device 9020, and one or more sensors 9021, such as a global positioning system (GPS) sensor, compass, accelerometer, or other sensor. The machine 9000 may include an output controller 9028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 9016 may include a machine readable medium 9022 on which is stored one or more sets of data structures or instructions 9024 (e.g., software) embodying or utilized by any one or more of the techniques or functions described herein. The instructions 9024 may also reside, completely or at least partially, within the main memory 9004, within static memory 9006, or within the hardware processor 9002 during execution thereof by the machine 9000. In an example, one or any combination of the hardware processor 9002, the main memory 9004, the static memory 9006, or the storage device 9016 may constitute machine readable media.

While the machine readable medium 9022 is illustrated as a single medium, the term "machine readable medium" may include a single medium or multiple media (e.g., a centralized or distributed database, and/or associated caches and servers) configured to store the one or more instructions 9024.

The term "machine readable medium" may include any medium that is capable of storing, encoding, or carrying instructions for execution by the machine 9000 and that cause the machine 9000 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable mediums may be described as non-transitory machine readable mediums. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 9024 may further be transmitted or received over a communications network 9026 using a transmission medium via the network interface device 9020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards promulgated by a Third Generation Partnership Project (3GPP), peer-to-peer (P2P) networks, among others. In an example, the network interface device 9020 may include one or more physical jacks (e.g., Ethernet, coaxial, or phone jacks) or one or more antennas to connect to the communications network 9026. In an example, the network interface device 9020 may include a plurality of antennas to wirelessly communicate using at least one of single-input multiple-output (SIMO), multiple-input multiple-output (MIMO), or multiple-input single-output (MISO) techniques.

The term "transmission medium" shall be taken to include any intangible medium that is capable of storing, encoding or carrying instructions for execution by the machine 9000, and includes digital or analog communications signals or other intangible medium to facilitate communication of such software.

The following are non-limiting examples.

Example 1 includes subject matter (such as a device, a mobile device for providing location based services, apparatus, or machine) comprising an input and output module configured to: receive one or more protocol messages (PMs) from each of a plurality of locator nodes (LNs), the PMs describing line of sight (LOS) relationships between pairs of the plurality of locator nodes identified by the respective LNs; and a control module configured to: calculate a line of sight network topology based upon the plurality of PMs; and provide location based services based upon the line of sight network topology.

In example 2, the subject matter of example 1 may optionally include, wherein the mobile device operates in accordance with an IEEE 802.11 family of standards.

In example 3, the subject matter of any one of examples 1-2 may optionally include, wherein the control module is configured to provide location based services by being configured to at least: identify a first one of the plurality of LNs and a second one of the plurality of LNs; determine a path between the first one and the second one; and provide the path to a user of the mobile device, the path comprising an ordered set of LNs, each successive pair of LNs in the ordered set being in a LOS relationship with each other.

In example 4, the subject matter of any one of examples 1-3 may optionally include, wherein the control module is configured to identify a first one of the plurality of LNs by being configured to at least: receive user input identifying an LN that the user can visually identify.

In example 5, the subject matter of any one of examples 1-4 may optionally include, wherein the control module is configured to identify a first one of the plurality of LNs by being configured to at least: determine that the first one of the plurality of LNs is in a line of sight relationship to the mobile device.

In example 6, the subject matter of any one of examples 1-5 may optionally include, wherein the control module is configured to determine that the first one of the plurality of LNs is in a line of sight relationship to the mobile device by being configured to at least: measure a characteristic of a wireless communications between the first one of the plurality of LNs and the mobile device; determine that the characteristic is better than a predetermined threshold; and designate the first one of the plurality of LNs as being in a LOS relationship to the mobile device if the characteristic is better than the predetermined threshold.

In example 7, the subject matter of any one of examples 1-6 may optionally include, wherein the control module is configured to identify a second one of the plurality of LNs by being configured to at least: receive user input identifying an LN the user would like to navigate to.

Example 8 includes or may optionally be combined with the subject matter of any one of Examples 1-7 to include subject matter (such as a method, means for performing acts, machine readable medium including instructions that, when performed by a machine cause the machine to performs acts, or an apparatus configured to perform) to provide location based services on a mobile device, the method comprising: receiving one or more protocol messages (PMs) from each of a plurality of locator nodes (LNs), the PMs describing line of sight (LOS) relationships between pairs of the plurality of locator nodes; calculating a line of sight network topology based upon the plurality of PMs; providing location based services based upon the line of sight network topology.

In example 9, the subject matter of any one of examples 1-8 may optionally include wherein the mobile device operates in accordance with an IEEE 802.11 family of standards.

In example 10, the subject matter of any one of examples 1-9 may optionally include, wherein providing location based services comprises: identifying a first one of the plurality of LNs and a second one of the plurality of LNs; determining a path between the first one and the second one; and providing the path to a user of the mobile device, the path comprising an ordered set of LNs, each successive pair of LNs in the ordered set being in a LOS relationship with each other.

In example 11, the subject matter of any one of examples 1-10 may optionally include, wherein identifying a first one of the plurality of LNs comprises: receiving user input identifying an LN that the user can visually identify.

In example 12, the subject matter of any one of examples 1-11 may optionally include wherein identifying a first one of the plurality of LNs comprises: determining that the first one of the plurality of LNs is in a line of sight relationship to the mobile device.

In example 13, the subject matter of any one of examples 1-12 may optionally include, wherein determining that the first one of the plurality of LNs is in a line of sight relationship to the mobile device comprises: measuring a characteristic of a wireless communications interface between the first one of the plurality of LNs and the mobile device; determining that the characteristic is better than a predetermined threshold; and designating the first one of the plurality of LNs as being in a LOS relationship to the mobile device if the characteristic is better than the predetermined threshold.

In example 14, the subject matter of any one of examples 1-13 may optionally include, wherein identifying a second one of the plurality of LNs comprises: receiving user input identifying an LN the user would like to navigate to.

Example 15 includes or may optionally be combined with the subject matter of any one of Examples 1-14 to include subject matter (such as a device, apparatus, or machine) comprising A locator node for providing location based services, the device comprising: a control module configured to: create a network topology description (TD), the TD describing a hierarchy of a plurality of other locator nodes, the hierarchy organized based upon line of sight (LOS) relationships between pairs of the plurality of other locator nodes, the LOS relationships identified based upon one or more protocol messages (PMs) received from each of the plurality of other locator nodes; and an input and output module configured to: periodically send a PM including the TD to the plurality of other nodes.

In example 16, the subject matter of any one of examples 1-15 may optionally include, wherein the control module is configured to create the TD by being configured to at least: determine that a first node of the plurality of other locator nodes is in a LOS relationship with the locator node based upon a wireless metric determined from a PM received from the first node; and add the first node to the TD as a child of the locator node.

In example 17, the subject matter of any one of examples 1-16 may optionally include, wherein the control module is configured to determine a LOS relationship based upon a wireless metric exceeding a threshold value.

In example 18, the subject matter of any one of examples 1-17 may optionally include, wherein the threshold value is predetermined.

In example 19, the subject matter of any one of examples 1-18 may optionally include, wherein the control module is configured to determine the threshold value relative to wireless metrics received from other PM messages.

In example 20, the subject matter of any one of examples 1-19 may optionally include, wherein the threshold value is an RSSI value.

In example 21, the subject matter of any one of examples 1-20 may optionally include, wherein the control module is configured to create the TD by being configured to at least: identify a second node that is indicated in the PM as being in a LOS relationship with the first node; determine that the path to the second node through the first node is the shortest path; responsive to determining that the path to the second node through the first node is the shortest path, update the TD to include the second node as a child of the first node.

In example 22, the subject matter of any one of examples 1-21 may optionally include, wherein the LN is a WiFi access point operating according to an IEEE 802.11 standard.

In example 23, the subject matter of any one of examples 1-22 may optionally include, wherein the PM messages are broadcast messages.

Example 24 includes or may optionally be combined with the subject matter of any one of Examples 1-23 to include subject matter (such as a method, means for performing acts, machine readable medium including instructions that, when performed by a machine cause the machine to performs acts, or an apparatus configured to perform) comprising a method to provide location based services using a locator node, the method comprising: creating a network topology description (TD), the TD describing a hierarchy of a plurality of other locator nodes, the hierarchy organized based upon line of sight (LOS) relationships between pairs of the plurality of other locator nodes, the LOS relationships identified based upon one or more protocol messages (PMs) received from each of the plurality of other locator nodes; and periodically sending a PM including the TD to the plurality of other nodes.

In example 25, the subject matter of any one of examples 1-24 may optionally include, wherein creating the TD comprises: determining that a first node of the plurality of other locator nodes is in a LOS relationship with the locator node based upon a wireless metric determined from a PM received from the first node; and adding the first node to the TD as a child of the locator node.

In example 26, the subject matter of any one of examples 1-25 may optionally include, wherein a LOS relationship is determined based upon a wireless metric exceeding a threshold value.

In example 27, the subject matter of any one of examples 1-26 may optionally include wherein the threshold value is predetermined.

In example 28, the subject matter of any one of examples 1-27 may optionally include wherein the threshold value is determined relative to wireless metrics received from other PM messages.

In example 29, the subject matter of any one of examples 1-28 may optionally include, wherein the threshold value is an RSSI value.

In example 30, the subject matter of any one of examples 1-29 may optionally include, wherein creating the TD further comprises: identifying a second node that is indicated in the PM as being in a LOS relationship with the first node; determining that the path to the second node through the first node is the shortest path; responsive to determining that the path to the second node through the first node is the shortest path, updating the TD to include the second node as a child of the first node.

In example 31, the subject matter of any one of examples 1-30 may optionally include wherein the locator node is a WiFi access point operating according to an IEEE 802.11 standard.

In example 32, the subject matter of any one of examples 1-31 may optionally include, wherein the PM messages are broadcast messages.

What is claimed is:

1. An apparatus of a locator node (LN) configured to provide location based services, the apparatus comprising:
   memory; and
   processing circuitry configured to:
   receive one or more protocol messages (PMs) from each locator node of a plurality of locator nodes;
   create a network topology description (TD), the TD having a root node corresponding to the LN and describing line of sight (LOS) relationships between the plurality of locator nodes and the LN, the LOS relationships identified based upon the one or more PMs, the TD comprising nodes corresponding to the plurality of locator nodes and a plurality of edges, each edge of the plurality of edges connecting a pair of locator nodes of the plurality of locator nodes that have a corresponding LOS relationship between the pair of locator nodes, wherein the TD includes a number of hops between the root node and each of the plurality of locator nodes; and
   interface circuitry configured to:
   periodically send a PM including the TD to a mobile device.

2. The apparatus of claim 1, wherein the processing circuitry is further configured to:
   determine that a first node of the plurality of locator nodes is in a LOS relationship with the LN based upon a wireless metric determined from a PM received from the first node; and
   add the first node to the TD as a child of the LN.

3. The apparatus of claim 2, wherein the processing circuitry is further configured to determine a LOS relationship based upon a wireless metric exceeding a threshold value.

4. The apparatus of claim 3, wherein the threshold value is predetermined.

5. The apparatus of claim 3, wherein the processing circuitry is further configured to determine the threshold relative to wireless metrics received from other PM messages.

6. The apparatus of claim 4, wherein the threshold value is an RSSI value.

7. The apparatus of claim 2, wherein the processing circuitry is further configured to:
   identify a second node that is indicated in the PM as being in a LOS relationship with the first node;
   determine that the path to the second node through the first node is the shortest path; and
   update the TD to include the second node as a child of the first node.

8. The apparatus of claim 1, wherein the LN is an access point operating according to an IEEE 802.11 standard.

9. A machine readable medium that stores instructions, which when performed by one or more processors of a locator node (LN) configured to provide location based services, configure the LN to:
   receive one or more protocol messages (PMs) from each locator node of a plurality of locator nodes;
   create a network topology description (TD), the TD having a root node corresponding to the LN and describing line of sight (LOS) relationships between the plurality of locator nodes and the LN, the LOS relationships identified based upon the one or more PMs, the TD comprising nodes corresponding to the plurality of locator nodes and a plurality of edges, each edge of the plurality of edges connecting a pair of locator nodes of the plurality of locator nodes that have a corresponding LOS relationship between the pair of locator nodes, wherein the TD includes a number of hops between the root node and each of the plurality of locator nodes; and
   periodically send a PM including the TD to a mobile device.

10. The machine readable medium of claim 9, wherein the instructions for creating the TD comprise instructions, which when performed by the one or more processors of the LN, configure the LN to:
  determine that a first node of the plurality of locator nodes is in a LOS relationship with the LN based upon a wireless metric determined from a PM received from the first node; and
  add the first node to the TD as a child of the LN.

11. The machine readable medium of claim 10, wherein the instructions for determining a LOS comprise instructions, which when performed by the one or more processors of the LN, configure the LN to determine the LOS relationship based upon a wireless metric exceeding a threshold value.

12. The machine readable medium of claim 11, wherein the threshold value is predetermined.

13. The machine readable medium of claim 11, wherein the instructions, which when performed by the one or more processors of the LN, further configure the LN to:
  determine the threshold relative to wireless metrics received from other PM messages.

14. The machine readable medium of claim 12, wherein the threshold value is an RSSI value.

15. The machine readable medium of claim 10, wherein the instructions for creating the TD comprises instructions, which when performed by the one or more processors of the LN, configure the LN to:
  identify a second node that is indicated in the PM as being in a LOS relationship with the first node;
  determine that the path to the second node through the first node is the shortest path; and
  update the TD to include the second node as a child of the first node.

16. A method to provide location based services using a locator node (LN), the method comprising:
  operating a processor of the LN to perform the operations of:
    receiving one or more protocol messages (PMs) from each locator node of a plurality of locator nodes:
    creating a network topology description (TD), the TD having a root node corresponding to the LN and describing line of sight (LOS) relationships between the plurality of locator nodes and the LN, the LOS relationships identified based upon the one or more PMs, the TD comprising nodes corresponding to the plurality of locator nodes and a plurality of edges, each edge of the plurality of edges connecting a pair of locator nodes of the plurality of locator nodes that have a corresponding LOS relationship between the pair of locator nodes, wherein the TD includes a number of hops between the root node and each of the plurality of locator nodes; and
    periodically sending a PM including the TD to a mobile device.

17. The method of claim 16, wherein creating the TD comprises:
  determining that a first node of the plurality of locator nodes is in a LOS relationship with the LN based upon a wireless metric determined from a PM received from the first node; and
  adding the first node to the TD as a child of the LN.

18. The method of claim 17, wherein a LOS relationship is determined based upon a wireless metric exceeding a threshold value.

19. The method of claim 18, wherein the threshold value is predetermined.

20. The method of claim 18, wherein the processor of the LN further performs the operation of:
  determining the threshold relative to wireless metrics received from other PM messages.

21. The method of claim 19, wherein the threshold value is an RSSI value.

* * * * *

UNITED STATES PATENT AND TRADEMARK OFFICE
CERTIFICATE OF CORRECTION

PATENT NO. : 9,885,579 B2
APPLICATION NO. : 15/090323
DATED : February 6, 2018
INVENTOR(S) : Rochberger et al.

It is certified that error appears in the above-identified patent and that said Letters Patent is hereby corrected as shown below:

In the Claims

In Column 18, Line 2, in Claim 16, delete "nodes:" and insert --nodes;-- therefor Signed and Sealed this
Eleventh Day of June, 2019

Andrei Iancu
*Director of the United States Patent and Trademark Office*